(12) United States Patent
Dohmann et al.

(10) Patent No.: US 6,379,639 B2
(45) Date of Patent: Apr. 30, 2002

(54) PROCESS FOR PURIFICATION OF FLUE GAS

(75) Inventors: Joachim Dohmann, Oberhausen; Jürgen Labuschewski, Tannenweg 67, 58638 Iserhohn; Hartmut Mensching, Essen; Iqbal Muhammad Mian, Dortmund, all of (DE)

(73) Assignee: Jürgen Labuschewski, Iserlohn (DE)

( * ) Notice: Subject to any disclaimer, the term of this patent is extended or adjusted under 35 U.S.C. 154(b) by 0 days.

(21) Appl. No.: 09/375,097

(22) Filed: Aug. 16, 1999

(30) Foreign Application Priority Data

Aug. 17, 1998 (DE) .......................................... 198 37 148

(51) Int. Cl.$^7$ .............................................. B01D 53/75
(52) U.S. Cl. .................... 423/210; 423/215.5; 423/235; 423/240 R; 423/243.08; 423/555; 110/345; 110/346
(58) Field of Search .............................. 423/210, 240 R, 423/243.08, 555, 215.5, 235; 110/345, 346

(56) References Cited

FOREIGN PATENT DOCUMENTS

| DE | 24 48 413 A1 | * | 4/1975 | ................. 423/210 |
|---|---|---|---|---|
| DE | 27 35 812 A1 | * | 2/1979 | ............... 423/215.5 |
| DE | 27 49 886 A | * | 5/1979 | ............. 423/240 R |
| DE | 32 26 757 A1 | * | 1/1984 | ............. 423/240 R |
| DE | 40 32 945 C1 | * | 1/1992 | ............. 423/240 R |
| DE | 43 17 756 A1 | * | 1/1995 | ................. 423/210 |
| WO | WO 90/15657 | * | 12/1990 | ................. 423/210 |

OTHER PUBLICATIONS

Merriam Webster's Collegiate Dictionary, 10th ed., Merriam Webster Inc., Springfield Massachusetts USA; (1997) ISBN 0–87779–(1997) 709–9, p. 1187.*

* cited by examiner

Primary Examiner—Steven P. Griffin
Assistant Examiner—Timothy C Vanoy
(74) Attorney, Agent, or Firm—Max Fogiel

(57) ABSTRACT

A method for purifyiing flue gas derived form incinerators burning refuse, wood, or sludge, in which the flue gas is cooled in a spray drier. A dust remover removes the dust from the flue gas. The flue gas is filtered through a filter-bed adsorber having filtering surfaces and packed with an adsorbent containing calcium hydroxide. The filter-bed adsorber is cleaned at intervals for removing adsorbate from the filtering surfaces. An aqueous suspension is prepared from at least some of the adsorbate that is removed from the filtering surfaces, and the flue gas is brought into contact with the suspension in at least one location upstream of the filter-bed adsorber for further separation of contaminates. The aqueous suspension is supplied to the spray drier for improving the purification of the flue gas.

14 Claims, 5 Drawing Sheets

PROCESS FOR PURIFICATION OF FLUE GAS

BACKGROUND OF THE INVENTION

The present invention concerns a method of purifying flue gas deriving from incinerators that burn refuse, wood, or sludge.

The method employs a neutralizer to precipitate the acidic constituents of the gas. Ordinarily the agent will be milk of lime measured out into one or both washers. The products of the neutralization reaction are sluiced in the form of a suspension out of the washers. Crystals of gypsum can be separated from the sluiced-out wash and exploited if desired. The wash or remaining wash is adjusted to a desired pH with more milk of lime in a separate neutralization section and forwarded to a spray drier. The solids that form in the drier as products of the reaction of the wash with the flue gas are sluiced out of the system by way of a dust remover downstream of the drier.

Some particular embodiments of such flue-gas purification plants employ two washers in series, the first using milk of lime to separate hydrohalides and the second sodium hydroxide as a neutralizer to separate sulfur oxides. Laterals from both washers are forwarded to a double-decomposition reactor, wherein gypsum crystals precipitate out of the solution. Final purification of the gas is carried out by a filter-bed adsorber, consisting of a flue-dust reactor with downstream filtering surfaces. Here, a powdered adsorbent is injected into the entering gas and deposits in the form of layers of filtering material on the surfaces. The adsorbent is usually calcium hydroxide with activated charcoal or similar materials added to it to improve its capacity to precipitate heavy metals and organic trace materials. Almost all the adsorbate is returned to the adsorber when the filtering surfaces are cleaned, although some is sluiced out of the system.

In spite of all its advantages in terms of effectively blocking pollutants, the method still has a drawback in that, especially when the washers separate satisfactorily, only a little of the pollutant freight can get into the adsorber and be separated. The adsorbate sluiced out of the system will accordingly still contain more calcium hydroxide than can be used in conventional processing. The excess has to be removed from the system and is accordingly lost.

Another version of the flue-gas purifier that has been employed in practice comprises a spray drier, a dust remover, a nitrogen remover, and a downstream filter-bed adsorber. Milk of lime is employed to neutralize acidic pollutants in the spray drier. The drops emitted inside the drier by the milk-of-lime suspension as it dries will evaporate in the prevailing heat. Neutralization will simultaneously occur in the liquid phase of the drops. Drying leaves the neutralizer and its reaction products in the form of powdered salts, which the dust remover sluices out of the system. Some of these known methods add activated charcoal or coke to the neutralizer to improve the separation of heavy metals and organic trace materials. Final purification of the gas is again carried out with a filter-bed adsorber.

In some flue-gas purifiers, the used adsorbate is taken from the adsorber in the form of dust and returned to the dust remover, downstream of the drier, by way of a conveyer line for further exploitation, especially of the activated-charcoal constituents. Since, however, the conditions upstream of the drier allow only limited reactions between the acidic components of the gas and the lime in the dried adsorbate, much of the lime in the adsorbate goes unused in this alignment as well.

SUMMARY OF THE INVENTION

The object of the present invention is a method of the aforesaid genus that will better exploit the lime in the adsorbate.

Processing the adsorbate into an aqueous suspension allows the unreacted lime in the adsorbate to react with the flue gas inside the drier and washers and the acidic components of the gas to separate. The unused lime in the adsorbate can then be used to replace some or all of the milk of lime. This approach will not only decrease the cost of manufacturing the neutralizer but will also reduce the consumption of fossil fuels to manufacture it. Furthermore, reducing the level of unreacted lime will also reduce the amount of waste products subject to disposal regulations. When the suspension containing the adsorbate is introduced into the spray drier, the unused activated charcoal in the adsorbate can also contribute to separating such heavy metals as mercury and such organic trace materials as polyhalogenated aromatic hydrocarbons (PCDD and PCDF).

BRIEF DESCRIPTION OF THE DRAWINGS

Various embodiments of the present invention will now be specified with reference to the accompanying drawing, wherein.

DESCRIPTION OF THE PREFERRED EMBODIMENTS

Figure 1:
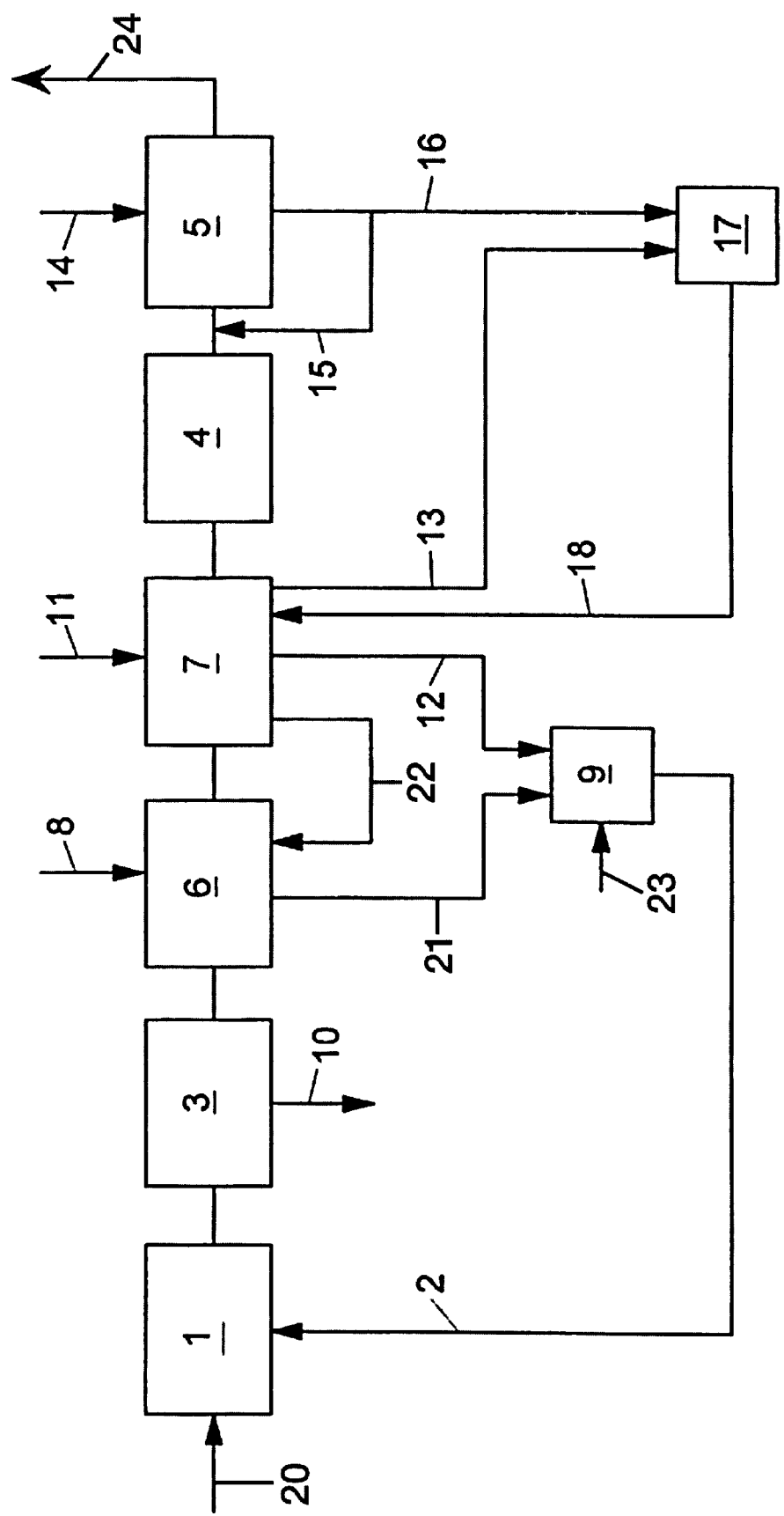
FIG. 1 is a flow diagram showing a method for purifying flue gas in accordance with the present invention.

Unpurified flue gas is derived from a furnace—an incinerator for burning refuse, wood, or sludge for example. Dust is removed from the gas in an unillustrated dust remover. The gas 20 then enters a spray drier 1, wherein processing water is sprayed into the flowing gas from a water line 2. The water exchanges heat with the gas and evaporates. The cooled gas enters another dust remover 3 and eventually a nitrogen oxide remover 4. Downstream of nitrogen remover 4 is a filter-bed adsorber 5 that completes the purification of the gas exiting from line 24.

Figure 2:
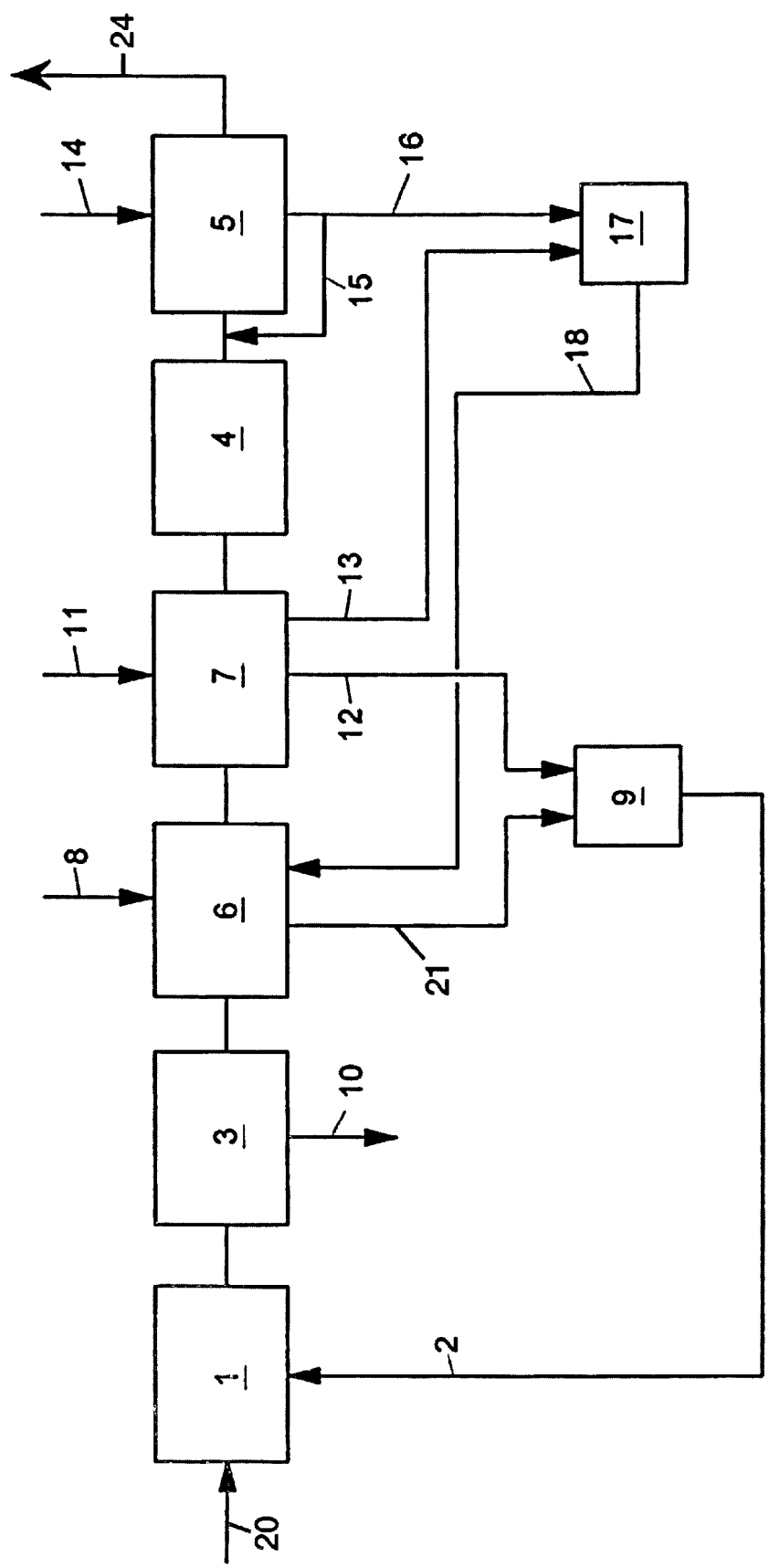
FIGS. 2 to 4 are each further embodiments of FIG. 1.
Figure 3:
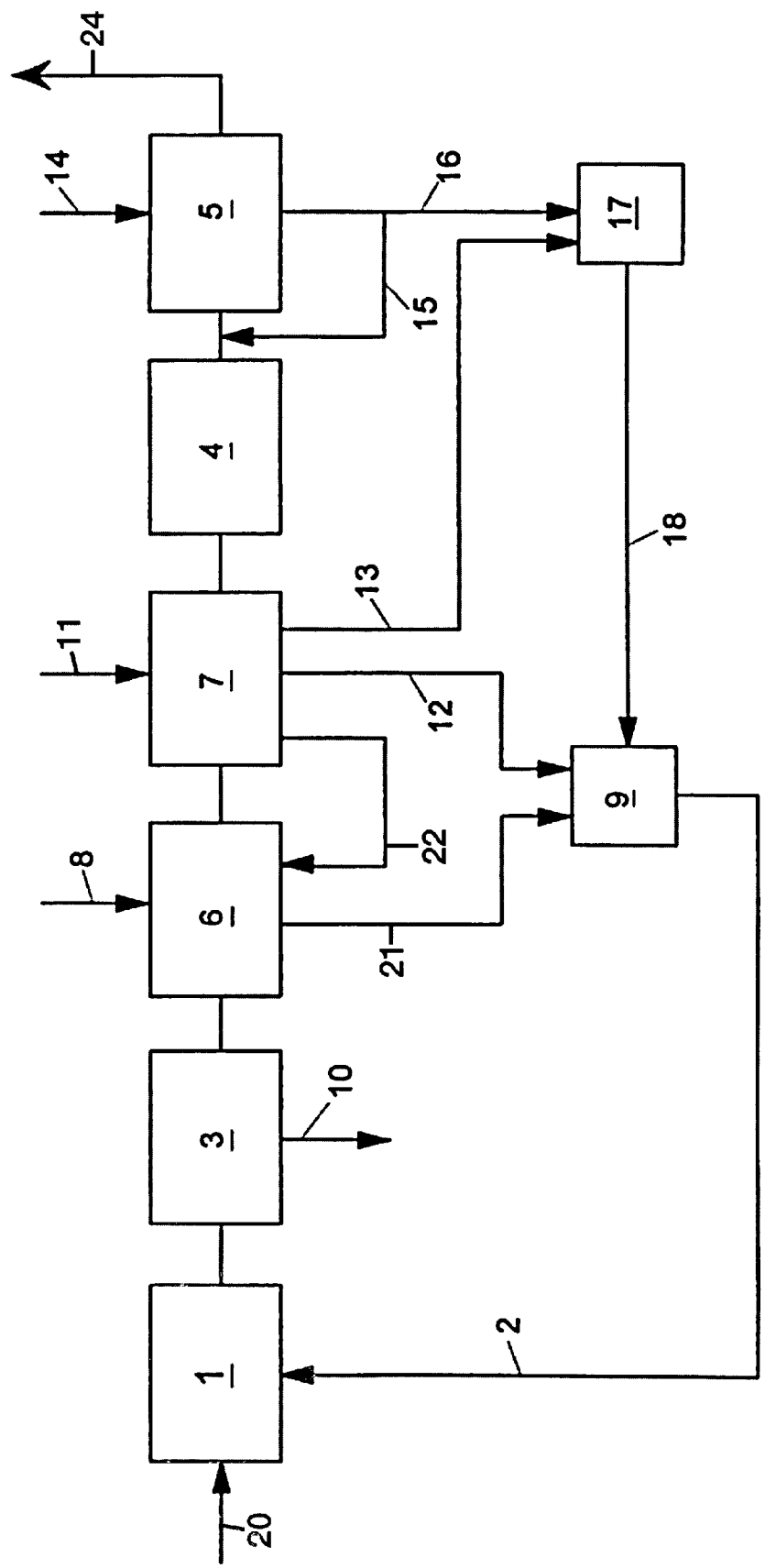

Between the dust remover 3 and the nitrogen remover 4 in the embodiments illustrated in FIGS. 1 through 3 are two washers—a hydrogen-chloride washer 6 and a sulfur-dioxide washer 7. Processing water and neutralizers in the form of oxides, hydroxides, or carbonates of alkaline-earth or alkaline metals are added to hydrogen-chloride washer 6 through one or more lines 8. The pH is adjusted to ensure that the hydrohalides, especially hydrogen chloride, are separated from the gas in washer 6. The water in washer 6 contains reaction salts, and is conveyed laterally by line 21 to a neutralization vessel 9, where it is treated with a neutralizer, milk of lime from line 23 in the embodiment illustrated in FIG. 1, to adjust its pH. The accordingly treated and neutralized water is fed to spray drier 1 through water line 2.

The water evaporates in spray drier 1. The alkaline components of the neutralized water react with the acidic flue-gas components and form salts. These, solid, reaction salts are separated out in dust remover 3 and sluiced out through a line 10.

Processing water is provided by line 11 to sulfur-dioxide washer 7 along with enough milk of lime or other neutralizer capable of removing sulfur from the flue gas to establish a pH at which the sulfur oxides will separate out of the gas. The reaction salts that form in washer 7 are extracted laterally along with the wash (through lines 12, 13). The extract is preferably forwarded to and concentrated in an unillustrated hydrocyclone and extracted through a bottoms line 12 and through a toppings line 13. The bottoms will contain a lot of crystallized reaction salts, mainly gypsum. The solid salts are sluiced out in accordance with the density or solids content of the wash and forwarded to the neutralization vessel 9 that receives the laterals from hydrogen-chloride washer 6. Some of the wash from washer 7 is returned to washer 6 by line 22.

Instead of two washers in series, a single washer can alternatively be employed to handle both the hydrohalides and the sulfur oxides.

Filter-bed adsorber 5 is a known device consisting of a flying-flow reactor with downstream filtering surfaces, a woven filter for example. Powdered adsorbent in the form of hydrated lime with activated charcoal or coke added to it is conveyed to adsorber 5 through a line 14. The adsorbent precipitates on the filtering surfaces and forms a cake. The flue gas being purified passes through the cake and reacts with it. The filtering surfaces are cleaned from time to time.

The adsorbate removed from the filtering surfaces when they are cleaned will still include some unreacted lime and activated charcoal or coke. Some of the adsorbate is returned as dust to filter-bed adsorber 5 through a recirculation line 15 by the conventional flying-flow method. The rest of the adsorbate is forwarded through a line 16 to a mixer 17, where it is suspended in water to prepare it for reaction and pumping. This suspension will be employed in the method in accordance with the present invention as will now be specified as a neutralizer for purifying the flue gas.

In the embodiments of the present invention illustrated in FIGS. 1 through 3, processing water and preferably the toppings from the line 13 leaving sulfur-dioxide washer 7 are exploited to prepare the adsorbate suspension. There will be fewer solids in the lateral in toppings line 13 than in that in bottoms line 12, and the former will accordingly be better able to accept more.

The adsorbate suspension is fed as illustrated in FIG. 1 to the sump of sulfur-dioxide washer 7 through a line 18. Here, the suspended lime will be available to neutralize the oxides. The suspended reaction products from the acidic flue-gas components precipitated in filter-bed adsorber 5 will either dissolve in the suspension or occur in the form of fine crystals in the wash inside washer 7. The total of all the reaction products from the separation of the acidic gas components is extracted laterally through the bottoms line 12 leaving the hydrocyclone connected to washer 7.

The embodiment illustrated in FIG. 1 is practical when no reusable gypsum is to be recovered or when the quality of the recovered gypsum is not important. Limitations on the quality of the gypsum derive from the high level of sulfite in the adsorbate that cannot be completely oxidized into sulfate in sulfur-dioxide washer 7.

Activated charcoal or coke from the adsorbate is added to the wash in sulfur-dioxide washer 7 along with lime. The toppings in hydrocyclone line 13 are rich in activated charcoal. Since the wash is loaded with the adsorbate suspension, the activated charcoal in toppings line 13 will return to washer 7 and accumulate in the wash. Although this accumulation will be detrimental to the whiteness of the gypsum, the pollutant binding-and-destroying properties of the carbon will provide additional advantage.

In the embodiment illustrated in FIG. 2, the adsorbate suspension is employed to neutralize the hydrohalides in the hydrogen-chloride washer 6. The suspension is prepared from processing water and fed to the washer's sump through line 18. The suspension converts the hydrohalides into their associated water-soluble calcium salts. Adding the suspension will not increase the pH of the wash in washer 6 so abruptly because the washer already contains a significant level of separated sulfur oxides. Some of the hydrocyclone toppings from sulfur-dioxide washer 7 can be employed as processing water.

In the embodiment illustrated in FIG. 3, a suspension is also prepared from the processing water and some of the adsorbate in mixer 17. In contrast to the embodiments hereintofore specified, however, adsorbate suspension is forwarded to spray drier 1 through line 2 and 18. In this version, additional neutralizers and such additional auxiliaries as activated charcoal can be added to the suspension. Before being fed to spray drier 1, the stream, can also be combined with other neutralizers, or with suspensions that include other neutralizers, obtained from neutralization vessel 9.

A neutralization reaction between the lime in the suspension and the acid pollutants in the flue gas occurs in spray drier 1. The activated charcoal in the suspension helps separate the heavy metals (mercury) and organic trace material (PCDD and PCDF). The reaction products are sluiced out of the system through the dust remover 3 downstream of the drier.

Figure 4:
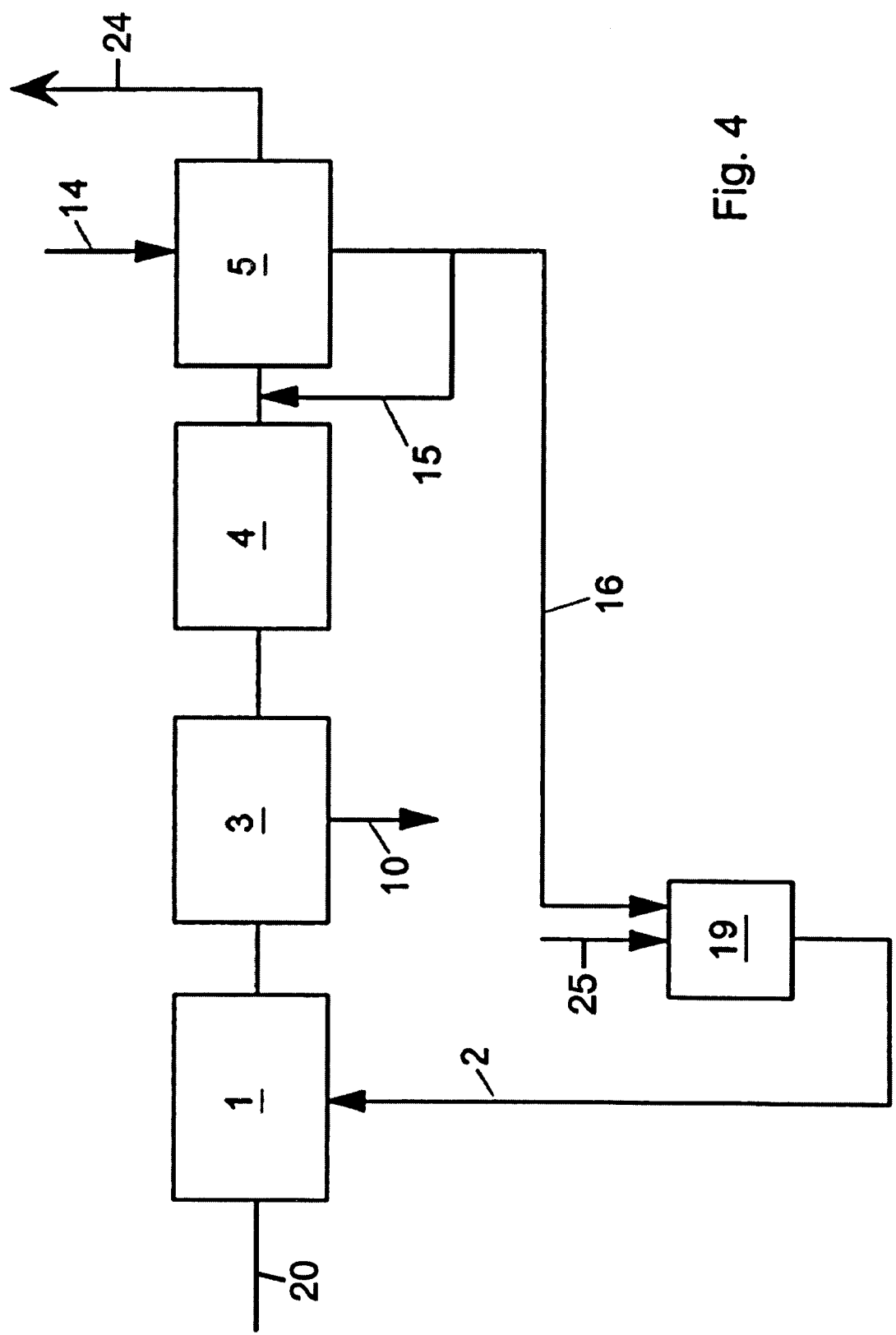
Figure 5:
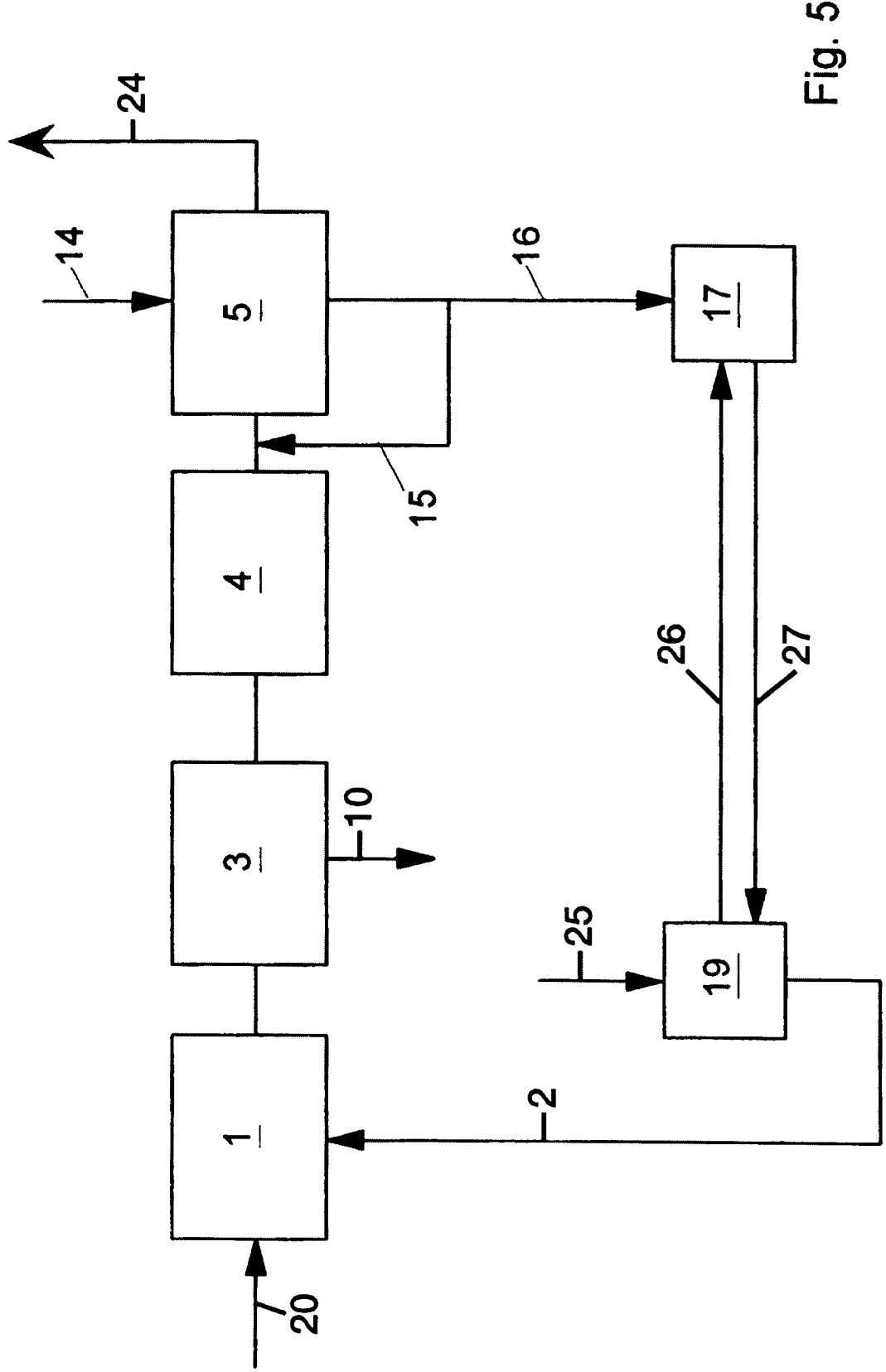
FIG. 5 is another embodiment of FIG. 4.

The embodiments of the method illustrated in FIGS. 4 and 5 employ no mixer, and the acid components of the flue gas are separated in spray drier 1, to which milk of lime is conveyed. The milk of lime is prepared in a mixer 19 from water and lime, optionally along with activated charcoal or coke and other auxiliaries supplied by line 25. From mixer 19, the milk of lime is fed to spray drier 1 either directly or by way of a batch reservoir. The subsidiary adsorbate is forwarded to mixer 19 through line 16 and combined with the lime in or before entering. In the embodiment illustrated in FIG. 5, the adsorbate can alternatively be conveyed to mixer 17 and the adsorbate suspension prepared therefrom along with milk of lime. The latter is obtained from mixer 19 through line 26 and the suspension returned thereto through line 27.

Additives that decrease the pH of aqueous solutions can be employed along with the adsorbate in any of the embodiments specified herein. Examples of such additives are carboxylic acids and some dicarboxylic acids and their alkaline or alkaline-earth metal salts. Technical-grade adipic acid for example is particularly useful.

These buffers promote separation of the acid flue-gas components, especially the sulfur oxides, in spray drier 1 or in sulfur-dioxide washer 7. The buffers can be added to the adsorbate suspension before it is added to the drier or even while it is still in the washer. There are in fact many possible ways of treating the suspension with such buffers.

Of particular advantage is an absorbent in filter-bed adsorber 5 that already contains buffers along with the main constituent calcium hydroxide and the subsidiary constituents activated charcoal or coke. The buffers will of course not take effect in adsorber 5 itself, but will when it is cleaned accompany the rest of the adsorbate through line 16 to the points in the system where buffering is needed. Since some of these buffers (e.g. calcium formate and adipic acid) are solid at the relevant temperatures, they will be particularly east to handle.

The buffers could also be measured out directly into the mixer 17 for instance or even injected into the gas as it enters filter-bed adsorber 5.

What is claimed is:

1. Method of purifying flue gas deriving from incinerators burning refuse, wood, or sludge, comprising the steps of: cooling the flue gas in a spray drier; removing dust from said flue gas in a dust remover; filtering said flue gas through a filter-bed adsorber to collect adsorbate containing calcium hydroxide on the filter surface; cleaning said filter-bed adsorber at intervals for removing adsorbate from said filtering surfaces of said filter-bed adsorber; preparing an aqueous suspension from a portion of the adsorbate removed from said filtering surfaces; bringing said aqueous suspension into contact with said flue gas in at least one location upstream of said filter-bed adsorber for further separation of contaminants; recirculating the remaining portion of adsorbate to the flue gas entering said filter-bed adsorber; said aqueous suspension of adsorbate contains unreacted lime and separates acidic components out of the flue gas in the spray drier.

2. A method as defined in claim 1, including the step of removing hydrohalides and sulfur oxides from said flue gas in two washers, one of said washers being located downstream of the other washer.

3. A method as defined in claim 2, wherein said aqueous suspension is supplied to one of said washers for separating sulfur dioxides from the flue gas.

4. A method as defined in claim 2, wherein said aqueous suspension is supplied to one of said washers for separating hydrohalides.

5. A method as defined in claim 2, wherein said washers emit liquid lateral streams, said aqueous suspension being prepared by combining at least some of said liquid lateral streams with at least some of said adsorbate collected from said filter-bed adsorber when cleaned.

6. A method as defined in claim 1, further comprising the step of adding pH-adjusting buffers selected from the group consisting of carboxylic acids, alkali metal salts of carboxylic acids, alkaline earth metal salts of carboxylic acids, dicarboxylic acids, alkali metal salts of dicarboxylic acids and alkaline earth metal salts of dicarboxylic acids to said aqueous suspension of said adsorbate before the step of bring the aqueous suspension of said adsorbate into contact with said flue gas in at least one location upstream of said filter-bed adsorber for further separation of contaminants.

7. A method as defined in claim 1, including the step of adding activated charcoal to said adsorbent containing calcium hydroxide before using the adsorbent to treat said flue gas in at least said filter bed absorber.

8. A method as defined in claim 1, including the step of adding coke to said absorbent containing a calcium hydroxide before using the adsorbent to treat said flue gas in at least said filter bed absorber.

9. A method as defined in claim 1, including the step of adding pH-adjusting buffers selected from the group consisting of carboxylic acids, alkali metal salts of carboxylic acids, alkaline earth metal salts of carboxylic acids, dicarboxylic acids, alkali metal salts of dicarboxylic acids and alkaline earth metal salts of dicarboxylic acids to said adsorbate.

10. A method as defined in claim 9, including the step of metering said buffers into said flue gas as said flue gas flows into said filter-bed adsorber; and collecting said buffers onto said filtering surface of said adsorber along with said adsorbent.

11. A method as defined in claim 9, including the step of adding said buffers to said adsorbate collected from said filter-bed adsorber when cleaned.

12. A method as defined in claim 9, including the step of adding said buffers to said suspension prepared from said adsorbate collected from said filter-bed adsorber when cleaned.

13. A method as defined in claim 1, wherein said suspension is supplied to said spray drier.

14. A method as defined in claim 1, wherein said aqueous suspension is prepared by combining substances selected from the group consisting of oxides, carbonates or hyrdroxides of alkali metal or alkaline-earth metals; dicarboxylic acids, alkali metal salts and alkaline-earth metal salts of dicarboxylic acids, carboxylic acids and alkali metal salts and alkaline-earth metal salts of carboxylic acids, with said adsorbate collected from said filter-bed adsorber when cleaned.

* * * * *